May 11, 1926.
C. GOTTSCHALK
TABLE SAW
Filed August 1, 1921
1,584,028
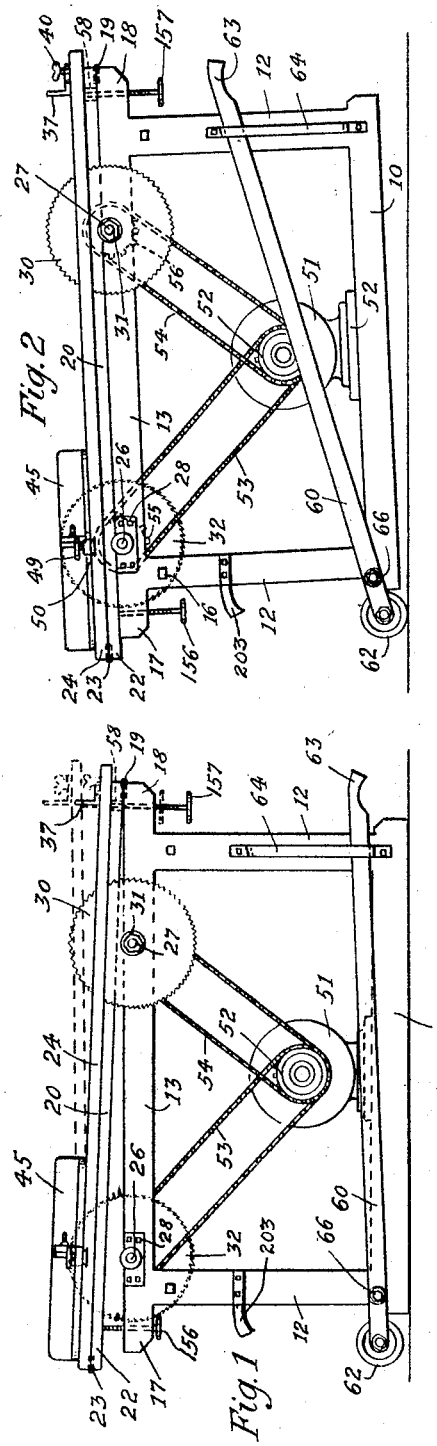
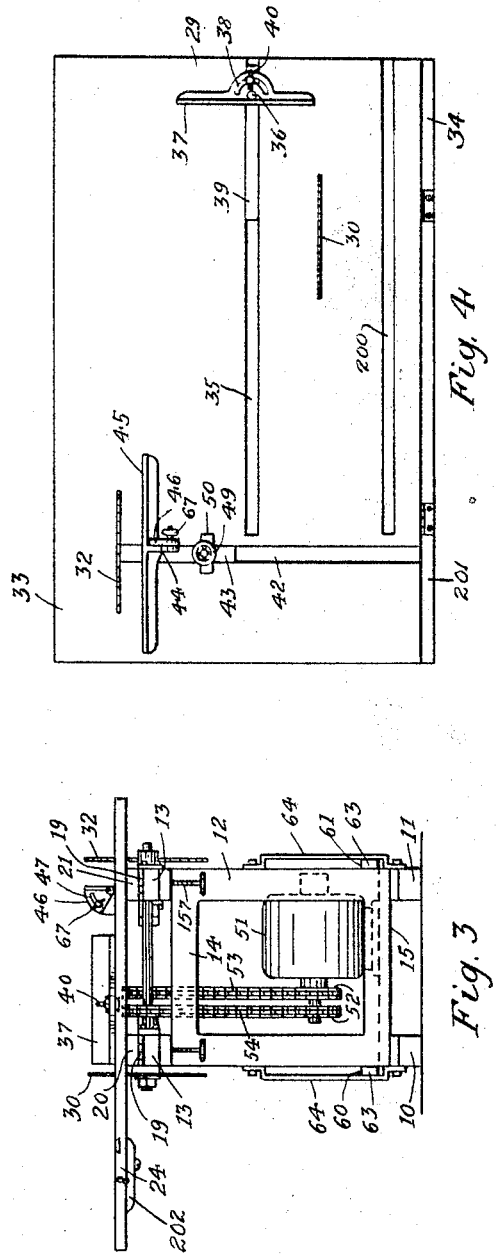
Inventor:
Charles Gottschalk.
By: *Howard Fischer*,
his Attorney.

Patented May 11, 1926.

1,584,028

UNITED STATES PATENT OFFICE.

CHARLES GOTTSCHALK, OF ST. PAUL, MINNESOTA.

TABLE SAW.

Application filed August 1, 1921. Serial No. 488,821.

My invention relates to table saws and has for an object to provide a saw table having a rip saw and a cross cut saw operatively positioned with regard to said table so that either or both of said saws may be simultaneously used.

Another object is to arrange said saws diagonally at opposite corners of the saw table so that either or both of said saws may be independently or simultaneously used.

Another object is to provide an electric motor for operating said saws which is positioned within the frame work of the saw table and which carries a pair of chains adapted to simultaneously drive both of said saws.

Another object of the invention is to provide a table top which may be independently or simultaneously tilted at either or both of its ends to raise the said top in relation to said saws so that the depth of cut of either of said saws may be independently regulated.

A still further object is to provide a member pivoted to the frame of said saw table having a supporting wheel mounted at one end thereof and a handle at the other end which is so arranged that when the same is raised said supporting wheel will engage the ground and cause the entire saw rack to be supported thereon so that the same may be easily transported from one location to another.

The full objects and advantages of my invention will appear in connection with the detailed description thereof and are particularly pointed out in the claims.

In the drawings, illustrating the application of my invention in one form:—

Fig. 1 is a side elevational view of my improved saw showing the same in operation with the table top tilted to cause one of the saws to make a shallow cut.

Fig. 2 is a view similar to Figure 1 showing the table top in its lowermost position with the entire saw rack in a position occupied when the same is being transported.

Fig. 3 is an end view of the device shown in Fig. 2.

Fig. 4 is a plan view of the device shown in Fig. 1.

My improved saw comprises a frame work, the construction of which can best be seen in Figures 1 and 3. A pair of skids 10 and 11 are adapted to lie upon the floor or ground and support the entire saw rack. These skids have attached to them four vertical uprights 12 which have placed across the tops thereof running in parallel relation to the skids 10 and 11 a pair of horizontally positioned rails 13 which support the saw table top proper. The uprights 12 are cross connected by means of rails 14 and 15 which are rigidly secured thereto. All of these frame members are bolted together by bolts, some of which are visible in the drawings and indicated at 16. The matter of attachment however, is well known in the art and need not be entered into in detail in this description.

The upper rail members 13 which carry the top of my improved saw table extend beyond the uprights 12 for a short distance as indicated at 17 and 18. To the forward end of the rails 13 are hingedly connected by means of hinges 19 a pair of longitudinal members 20 and 21 which extend parallel with and are adapted to lie flat on the said rails 13 as clearly indicated in Figure 2. These horizontal members extend beyond the rearward portion 17 of rails 13 a small amount at 22 and have hingedly connected to them at these ends by means of hinges 23 a top 24 which is shown in plan view in Figure 4 and extends outwardly beyond the entire frame work of the saw on all sides thereof.

The saws of my invention are mounted on two mandrels or arbors 26 and 27 which are journalled in bearings 28 secured to the respective rail members 13 as clearly indicated in Figures 1 and 3. These bearings are so positioned that the shafts extend through the rails 13 and project outwardly beyond the same on the sides thereof. These shafts are further arranged so as to bring the same as near the top surface 24 as is consistent with the driving and the mounting of said shafts. Upon operating the device the user stands in front of the forward end of the saw which is indicated at 29 in Figure 4 and which will in the future be referred to as the forward end of the saw table. Upon the left end of mandrel 27 as viewed from the forward end of the saw is mounted a circular cross cut saw 30 which is attached thereto by means of a nut 31 in the usual manner. This saw is positioned outside of the rail 13 adjacent the same. In a similar manner a circular rip saw 32 is positioned on the opposite end of mandrel 26 and extends outside of the corresponding rail member 13 on its side of the device. These saws are both adapted to extend through the top 24 of the saw table so that when the said table is in the position shown in Figure 2 the said saws extend through said table a maximum amount and are hence able to make the deepest cut with said table in this position.

The use of these saws can best be ascertained by the examination of Figure 4. It will be noted that saw 32 is positioned well towards the rear of top 24 and fairly close to the edge of said top indicated at 33, while on the other hand the saw 30 is positioned well inward from the forward portion 29 of table 24 and also well inward from the edge 34 thereof. For guiding the lumber or material to be sawed towards cross cut saw 30 I provide a groove 35 extending longitudinally of top 24 positioned somewhat away from the saw 30 and to the right thereof. This groove which is preferably formed of dove tailed cross section is adapted to have slidably positioned within the same a sliding bar 39 which has pivoted to it at 36 an angular guide member 37. This member is provided with an arcuate slot 38 by means of which the said angular member 37 may be securely clamped to the sliding bar 39 in any position thereon by means of a thumb nut 40. In this manner guide 37 may be clamped in any angular position relative to the saw 30. In the use of the device lumber to be sawed is placed ahead of guide member 37 and the same together with the lumber advanced along the groove 35 until the saw engages the same and severs the end of the piece of lumber projecting beyond the same.

As can be clearly seen in the drawings I also provide another groove 200 similar to groove 35 in which the guide member 39 may be slid if desired. This groove is positioned to the left of the saw 30 and runs parallel with the groove 35. In the drawings I have shown but the single guide member corresponding with these grooves though it can be readily understood that two such members may be employed if desired. This second groove serves to guide the lumber when it is desired to have the space to the right of the saw clear for ripping purposes. When the user constantly changes from ripping to cross cutting this is particularly advantageous as it does not necessitate withdrawing the guide from the groove 35 every time the said change is desired to be made.

In order to permit the machine to saw a maximum width of stick the saw 30 is positioned away from the forward portion 29 and the edge 34 of top 24 as clearly shown in Figure 4. This also permits a substantial piece to be sawed off the end of the piece of lumber while the same is still supported on the table top proper. When an extra large piece of lumber is desired to be cut off by saw 30 I provide an auxiliary leaf 201 which is hinged to the top 24 to swing downwardly, which leaf may be held in the plane of said top by means of a brace 202 illustrated in Fig. 3. When transporting the device or when said leaf is not in use the same may be dropped downwardly as shown in Fig. 4. In this manner the saw table is adapted to accommodate all sizes of lumber and at the same time may be moved through doors and openings of ordinary size.

For guiding the lumber along the rip saw 32 I provide a dove tailed groove 42 in which is slidably mounted a bar 43. This bar has an upstanding ear 44 to which is pivoted a guide member 45 as best shown in Figure 3. Guide member 45 is formed with a corresponding ear 46 which has an arcuate slot 47. By means of thumb nut 67 the said guide member 45 may be tilted relative to the table top, and held in any desired position. With this device the piece of lumber may be ripped at any required angle. To hold the member 43 from movement when the ripping occurs I form the same with a hand screw 49 which is adapted to pass through a plate 50 extending across the groove 42 which screw is screwable into the member 43. When the said screw 49 is tightened down guide 45 is held from movement within the slot 42 as becomes clearly evident.

For driving my saws I provide an electric motor 51 which is positioned on a longitudinal member 52 extending across and secured to the skid members 10 and 11. This motor is provided with two sprocket wheels 52 which drives two chains 53 and 54 which pass upwardly and over a pair of sprockets 55 and 56 mounted directly on the mandrels 26 and 27 respectively. It will further be noted that both of the saws are simultaneously driven and that they are operated from the same motor so that both saws are running at the same time and may be independently or jointly used. It can readily be understood that although I have described my invention as driven by an electric motor the same may be connected with a gasoline engine instead.

For adjusting the positioning of the table top 24 relative to the two saws 30 and 32 I provide pairs of hand screws 156 and 157 which are screwable into the projecting ends 17 and 18 of the rail members 13. The screws 156 are adapted to engage in the underside of the protruding portions 22 of the longitudinal members 20 while the screws 157 pass directly into apertures 58 in said longitudinal member and directly engage the under-portions of the top 24. With this construction the top 24 may be swung upwardly by manipulating screws 157 thereby oscillating said top on the hinge 23 so as to adjust the positioning of said top relative to the saw 30. In this manner the depth of the cut or the projection of said saw above the table may be varied at will. For adjusting the relative positioning of saw 32 relative to said table top 24 the screws 156 are employed. By screwing said screws upwardly the said top and longitudinal members 20 are both raised on the hinge 19 thereby moving the rearward end of table 24 in the same relation to saw 32 as was acquired by the movement of said top in regard to the saw 30. Inasmuch as the saws are positioned fairly close to the hinges 19 and 23 the movement of the table for one of the saws does not appreciably affect the positioning of the same in regard to the other saw so that the depth of cut of either of the two saws may be adjusted independently or simultaneously if desired.

Another feature of the invention lies in the device used in transporting the entire saw rig from one location to another. The operation of this device is best brought out in Figures 1 and 2. A pair of long arms 60 and 61 are pivoted near their extreme ends to the rearward portion of the skid members 10 and 11 at 66. These arms have journalled at their ends wheels 62 which when the handles lie in the normal downward position as indicated in Figure 1, are raised up from the floor on which the saw rig rests. The forward portion of the arms 60 are provided with hand grasping handles 63 and are adapted to slide on the uprights 12 between said uprights and a keeper 64 rigidly secured thereto. When the device is positioned as shown in Figure 1 and handle 23 grasped and raised upwardly as shown in Figure 2 the said handles cause the wheel 62 to engage the floor and lift skid members 10 upwardly therefrom. In this position the entire saw rig may be conveniently trucked from one locality to another so that the said saw may be used wherever desired. In view of the fact that the source of power for the saw is mounted within the frame work of the same the said saw forms a complete unit which may be operated at any locality and with reference to any particular machine desired. To permit the entire saw rig to be carried bodily or lifted upstairs I provide an additional pair of handles 203 which are secured to the rear uprights 12. In so transporting the device two men are required, one of whom grasps the said handles 203 while the other grasps the aforementioned handles 63. In this manner the device can readily be carried when the same becomes necessary.

When it is desired to remove either of the circular saws from their respective arbors the table top 24 is swung upwardly on either of its pairs of hinges and propped up sufficiently to bring the said top above either of the said saws as may be required. In this position the top may be propped up by a stick or other expedient thereby permitting the free access to the saws for the removal of the same. Upon the unscrewing of the nuts which hold the same in place both of said saws may be drawn directly outwardly and other saws substituted in place thereof.

The advantages of my invention are manifest. A complete unit is provided which may be easily transported from one place to another. The saw unit comprises both a circular and a rip saw which may be separately or jointly used without interfering with each other thereby giving the machine a universal use and eliminating the additional trouble and inconvenience of interchanging saws when it is desired to use one or the other of the said saws. My improved transporting device permits of readily trucking the entire device around. With the tilting the table in two directions each of the saws can be independently adjusted relative to the table top so that the depth of cut may be varied at will.

In accordance with the patent statutes I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims.

I claim:—

1. A table saw comprising a frame having a pair of horizontal rails, a pair of longitudinal members hinged to said rails at one end, a single table top hinged to said longitudinal members at their other ends, a circular cross cut saw positioned at one end of said frame and extending through said top, a circular rip saw positioned at the other end of said frame and extending through said single table top, means for simultaneously oscillating said longitudinal members and top about the said horizontal members hinges and means for independently oscillating said top relative to said horizontal members about said top hinges so as to vary the relative depth of cut of either of said saws.

2. In a saw machine, a frame, a plurality of parallel shafts, the space between said shafts being greater than the distance from either of said shaft to the nearest edge of the frame, means for rotating said shafts, a support hinged to said frame, and a rectangular one piece table top pivoted to said support and having openings therein each to receive a portion of one of said saws, the hinges of the support and of the table top being on opposite sides of said frame whereby said table top may be raised with said support or with respect to said support.

In testimony whereof I affix my signature.

CHARLES GOTTSCHALK.